US011927469B2

(12) United States Patent
Inglund et al.

(10) Patent No.: US 11,927,469 B2
(45) Date of Patent: Mar. 12, 2024

(54) PROOF TEST OF RADAR LEVEL GAUGE SYSTEM

(71) Applicant: Rosemount Tank Radar AB, Mölnlycke (SE)

(72) Inventors: Mikael Inglund, Stora Höga (SE); Tobias Lilja, Sturefors (SE); Tomas Wennerberg, Kållered (SE); Lars-Ove Larsson, Linköping (SE); Pär Abrahamsson, Linköping (SE); Christian Skaug, Öjersjö (SE)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 430 days.

(21) Appl. No.: 17/298,982

(22) PCT Filed: Dec. 19, 2018

(86) PCT No.: PCT/EP2018/085942
§ 371 (c)(1),
(2) Date: Jun. 2, 2021

(87) PCT Pub. No.: WO2020/125977
PCT Pub. Date: Jun. 25, 2020

(65) Prior Publication Data
US 2022/0065685 A1 Mar. 3, 2022

(51) Int. Cl.
*G01F 25/20* (2022.01)
*G01F 23/284* (2006.01)

(52) U.S. Cl.
CPC ........... *G01F 25/24* (2022.01); *G01F 23/284* (2013.01)

(58) Field of Classification Search
CPC ........ G01S 13/885; G01S 13/08; G01S 13/88; G01S 13/103; G01S 7/40; G01S 7/4052;
(Continued)

(56) References Cited

U.S. PATENT DOCUMENTS

| 4,737,791 A | * | 4/1988 | Jean | ...................... G01F 23/284 342/124 |
| 4,847,623 A | * | 7/1989 | Jean | ........................ G01S 13/34 342/124 |

(Continued)

FOREIGN PATENT DOCUMENTS

| RU | 2664916 C2 | * | 8/2017 | ........... G01S 23/284 |
| RU | 2015153831 A | * | 8/2017 | ........... G01F 23/284 |

OTHER PUBLICATIONS

European International Search Report and Written Opinion for International Application No. PCT/ EP2018/085942, dated Sep. 12, 2019, 9 pages.

*Primary Examiner* — Vladimir Magloire
*Assistant Examiner* — Michael W Justice
(74) *Attorney, Agent, or Firm* — Westman, Champlin & Koehler, P.A.

(57) ABSTRACT

The present invention relates to a method of proof-testing a radar level gauge system arranged to determine a filling level of a product in a tank, the method comprising the steps of: transmitting an electromagnetic transmit signal towards a surface of the product in the tank; receiving an electromagnetic reflection signal resulting from reflection of the transmit signal at the surface of the product; forming a measurement representation based on the transmit signal and the reflection signal, the measurement representation comprising surface echo information indicative of the filling level of the product; adding, to the measurement representation, proof test echo information indicative of a predefined proof test level, resulting in a modified measurement representation; processing the modified measurement representation to determine a proof test level based on the modified measurement representation; and providing a signal indicative of a result of the processing.

19 Claims, 6 Drawing Sheets

(58) Field of Classification Search
CPC .... G01F 23/284; G01F 25/0061; G01F 25/24; G01F 25/20; G01F 25/00
USPC .............................. 342/124; 73/290 R, 1.73
See application file for complete search history.

(56) References Cited

U.S. PATENT DOCUMENTS

| | | | | |
|---|---|---|---|---|
| 5,406,842 | A * | 4/1995 | Locke | G01S 13/32 73/290 R |
| 7,525,476 | B1 * | 4/2009 | Delin | G01S 7/4056 73/304 R |
| 7,586,435 | B1 * | 9/2009 | Edvardsson | G01S 7/4052 73/290 R |
| 7,924,216 | B2 * | 4/2011 | Delin | G01F 23/284 73/290 R |
| 8,552,744 | B2 * | 10/2013 | Michalski | G01F 23/284 324/637 |
| 9,322,699 | B2 * | 4/2016 | Korsbo | G01F 23/284 |
| 10,801,878 | B2 * | 10/2020 | Schultheiss | G01F 23/284 |
| 2007/0046528 | A1 * | 3/2007 | Larsson | G01F 23/284 342/174 |
| 2009/0121917 | A1 * | 5/2009 | Delin | G01S 13/08 342/124 |
| 2009/0273506 | A1 * | 11/2009 | Delin | G01F 23/80 342/124 |
| 2012/0056628 | A1 * | 3/2012 | Michalski | G01F 23/284 324/629 |
| 2015/0009063 | A1 * | 1/2015 | Korsbo | G01F 25/20 342/124 |
| 2015/0276462 | A1 * | 10/2015 | Kleman | G01S 13/343 342/124 |
| 2018/0003542 | A1 * | 1/2018 | Schultheiss | G01S 7/4008 |
| 2018/0209835 | A1 * | 7/2018 | Blödt | G01S 13/12 |
| 2020/0041324 | A1 * | 2/2020 | Dieterle | G01S 7/027 |

* cited by examiner

PROOF TEST OF RADAR LEVEL GAUGE SYSTEM

CROSS-REFERENCE TO RELATED APPLICATION

This Application is a Section 371 National Stage Application of International Application No. PCT/EP2018/085942, filed Dec. 19, 2018 and published as WO 2020/125977 A1 on Jun. 25, 2020, in English, the entire contents of which are hereby incorporated by reference in their entireties.

TECHNICAL FIELD OF THE INVENTION

The present invention relates to a radar level gauge system, to a method of proof-testing a radar level gauge system, and to a method of operating a radar level gauge system.

TECHNICAL BACKGROUND

Radar level gauges are in wide use for measuring the filling level of a product in a tank. Radar level gauging is generally performed by propagating an electromagnetic transmit signal towards the product in the tank, and receiving an electromagnetic surface reflection signal resulting from reflection of the transmit signal at the surface of the product.

The transmitted electromagnetic signal may be radiated towards the product in the tank, or may be guided towards and into the product by a transmission line probe. The latter is often referred to as Guided Wave Radar (GWR).

Based on the transmit signal and the surface reflection signal, the distance to the surface of the product can be determined. The filling level can be deduced from this distance.

Radar level gauges are often classified as either pulsed systems or FMCW-systems. In pulsed systems, pulses are transmitted towards the surface of the product, and the distance to the surface is determined based on the time-of-flight of the pulse to the surface and back to the radar level gauge. In FMCW-systems, a signal with a time-varying frequency is transmitted towards the surface and the distance is determined based on the frequency (and/or phase) difference between a transmitted signal and a simultaneously received signal. So-called pulsed FMCW-systems also exist.

Radar level gauges are in some cases used for applications where malfunction of the radar level gauge could result in dangerous situations.

For example, a radar level gauge with overfill prevention functionality must be extremely reliable.

Various measures are taken to ensure the reliability of radar level gauges, in particular radar level gauges with overfill prevention functionality, and to thereby reduce the risk of dangerous situations, such as overfill. For instance, radar level gauges and other important devices may be designed to fulfill a certain Safety Integrity Level (SIL) as defined by the international standard IEC/EN 61508. According to this standard, safety related systems may fulfill the requirements for different Safety Integrity Levels from $SIL_1$ to $SIL_4$, where $SIL_4$ represents the highest safety integrity level and $SIL_1$ represents the lowest safety integrity level.

The SIL-rating of a system is related to the probability of failure on demand, which is in turn a function of the failure rate and the time between proof tests. To maintain a certain SIL-rating, it is thus necessary to perform proof tests at a regular interval specified in accordance with the SIL-rating. For example, proof tests may need to be performed annually.

Proof tests are generally specified by the manufacturer of the SIL-rated system and it is the responsibility of the user of the system that the proof tests are carried out properly.

The most realistic proof test is to fill the tank to its high level alarm limit which will trigger the high level alarm (which is a Safety Instrumented Function, SIF) and prove that it works. This procedure is however often very unpractical, and may also be related to safety risks. Another way to proof test is to add a reference reflector in the tank at the high-level alarm limit. The radar level gauge can then use the echo created from the reference reflector as a reference and measure on it to prove that if the actual product level will be at the same position in the tank the alarm will work as expected. This will generate enough proof test coverage to normally keep the SIL rating for the SIF mission time. This approach is described in U.S. Pat. No. 9,325,077.

Performing proof tests using a reference reflector is a good solution, avoiding the disadvantages of actually filling the tank up to the high level alarm limit. However, in some cases it may be undesirable or difficult to mount a reference reflector kit as a retrofit installation.

SUMMARY

In view of the above, it would thus be desirable to provide an alternative proof testing approach, which may be easier to implement, especially in a retrofit situation.

According to a first aspect of the present invention, it is therefore provided a method of proof-testing a radar level gauge system arranged to determine a filling level of a product in a tank, the method comprising the steps of: transmitting an electromagnetic transmit signal towards a surface of the product in the tank; receiving an electromagnetic reflection signal resulting from reflection of the transmit signal at the surface of the product; forming a measurement representation based on the transmit signal and the reflection signal, the measurement representation comprising surface echo information indicative of the filling level of the product; adding, to the measurement representation, proof test echo information indicative of a predefined proof test level, resulting in a modified measurement representation; processing the modified measurement representation to determine a proof test level based on the modified measurement representation; and providing a signal indicative of a result of the processing.

The present invention is based on the realization that a reliable proof test, requiring no generally undesirable providing of product up to the high level alarm limit and no installation of additional hardware inside the tank, can be achieved by adding proof test echo information to a measurement signal formed by the radar level gauge system. In other words, a synthetic proof test level representation, such as a signal, is added in the measurement chain of the radar level gauge system. Embodiments of the present invention allow for proof testing of all parts of the radar level gauge system, with the possible exception of the signal propagation arrangement (antenna or probe) and parts of the transceiver. Since the proof test echo information is added to, rather than replacing, the measurement representation, most of the functionality of the signal propagation arrangement and the transceiver can be verified through a regular determination of the filling level of the product in the tank, based on the modified measurement representation.

According to embodiments, the method may further comprise the steps of receiving the signal indicative of the result of the processing; and providing a proof test alarm when the signal indicates the proof test level.

For an analog output interface in the radar level gauge system, the filling level can be communicated as a current between 4 mA and 20 mA. The high level alarm limit may correspond to a current within this range. Alternatively, the high level alarm limit may be set at the radar level gauge, which may then be configured to communicate an overfill condition with an alarm current, for instance 21.75 mA (a current outside the 4 to 20 mA range).

In many field applications, there is provided a digital communication link. This will provide possibilities of communicating several indications for a present operational condition. For instance, an alarm and a determined filling level could be communicated independently of each other.

According to a second aspect of the present invention, it is provided a radar level gauge system for determining a filling level of a product in a tank, the radar level gauge system comprising: a transceiver for generating, transmitting and receiving electromagnetic signals; a signal propagation arrangement connected to the transceiver and arranged to propagate an electromagnetic transmit signal from the transceiver towards the product in the tank, and to return to the transceiver an electromagnetic reflection signal resulting from reflection of the electromagnetic transmit signal at a surface of the product; and measurement representation forming circuitry for forming a measurement representation based on the transmit signal and the reflection signal, the measurement representation comprising surface echo information indicative of the filling level of the product; proof test echo information adding circuitry, for adding to the measurement representation, proof test echo information indicative of a predefined proof test level, resulting in a modified measurement representation; and level determining circuitry coupled to the transceiver and configured to determine a proof test level based on the modified measurement representation.

The tank may be any container or vessel capable of containing a product, and may be metallic, or partly or completely non-metallic, open, semi-open, or closed.

The "transceiver" may be one functional unit capable of transmitting and receiving electromagnetic signals, or may be a system comprising separate transmitter and receiver units.

One or several of the measurement representation forming circuitry, the proof test echo information adding circuitry, and the level determining circuitry may be provided as separate devices, or as a single device, and may be realized through hardware, software or a combination thereof.

The signal propagation arrangement may be any arrangement capable of propagating the electromagnetic transmit signal. For example, the signal propagation arrangement may comprise an antenna or a transmission line probe.

In various embodiments, the radar level gauge system may be controllable between a filling level measuring state and a proof test state. In the proof test state, the level determining circuitry may be configured to: determine the proof test level based on the modified measurement representation; and provide a signal indicative of the proof test level to allow determination of a proof test result based on the proof test level.

In the filling level measuring state, the level determining circuitry may be configured to: determine the filling level of the product in the tank based on the measurement representation; and provide a signal indicative of the filling level.

Moreover, the radar level gauge according to various embodiments of the present invention may advantageously be comprised in a filling level measuring system, further comprising a host system receiving measurement signals from the radar level gauge.

BRIEF DESCRIPTION OF THE DRAWINGS

These and other aspects of the present invention will now be described in more detail, with reference to the appended drawings showing a currently preferred embodiment of the invention, wherein.

DETAILED DESCRIPTION OF EXAMPLE EMBODIMENTS OF THE INVENTION

In the present detailed description, various embodiments of the radar level gauge system and method according to aspects of the present invention are mainly discussed with reference to a radar level gauge system of the FMCW (Frequency Modulated Continuous Wave) type having a radiating antenna. It should be noted that this by no means limits the scope of the present invention, which is defined by the enclosed set of claims and equally well includes, for example, radar level gauge systems of the pulsed type, or radar level gauge systems with other signal propagation arrangements, including, for example other types of radiating antennas or various kinds of probes.

Figure 1:
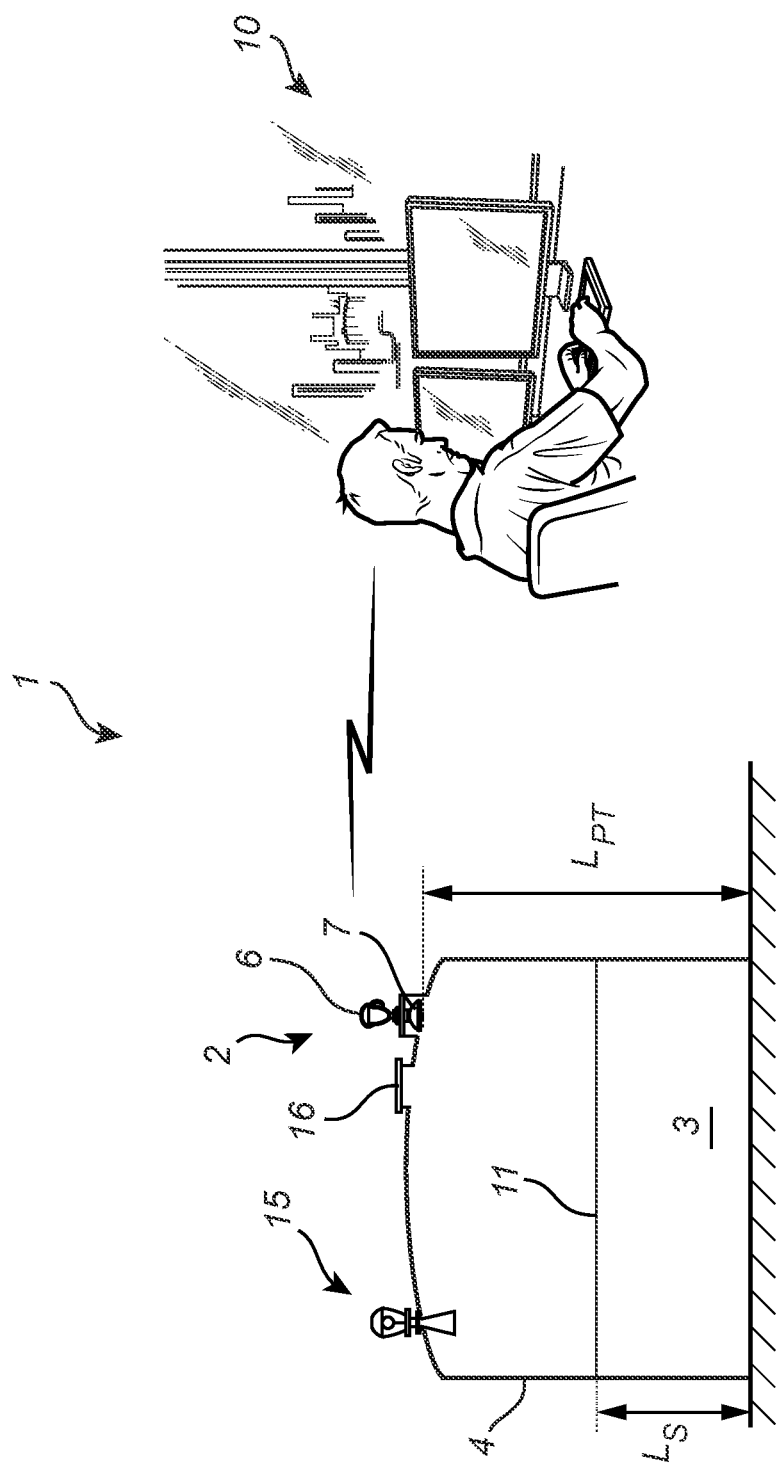
FIG. 1 schematically shows a filling level measuring system comprising a radar level gauge system according to an embodiment of the present invention, and a host system.

FIG. 1 schematically shows a level measuring system 1 comprising a radar level gauge system 2 according to an example embodiment of the present invention and a host system 10 illustrated as a control room.

The radar level gauge system 2 is installed to measure the filling level of a product 3 contained in a tank 4. The radar level gauge system 2 comprises a measuring unit 6 and a signal propagation arrangement, here in the form of a parabolic antenna 7. A proof test level $L_{PT}$, which may correspond to, or be higher than, the high level alarm limit of the level measuring system 1 is indicated in FIG. 1.

As can also be seen in FIG. 1, the tank 4 may be equipped with an additional radar level gauge system 15 which may be used for determining the filling level $L_S$ of the product 3 in the tank 4. It would also be possible to use a so-called 2-in-1 solution if the radar level gauge system 2 includes two separated measurement channels, effectively making it two radar level gauges sharing the same antenna 7.

In addition, the tank 4 is shown to comprise an inspection hatch 16 allowing access to the inside of the tank 4 for enabling, for example, hand dipping for manually determining the filling level $L_S$.

The radar level gauge system 2 in FIG. 1 is configured to allow the operator of the filling level measuring system 1 to carry out reliable proof tests of the radar level gauge 2 itself as well as of the filling level measuring system 1 as a whole.

Figure 2:
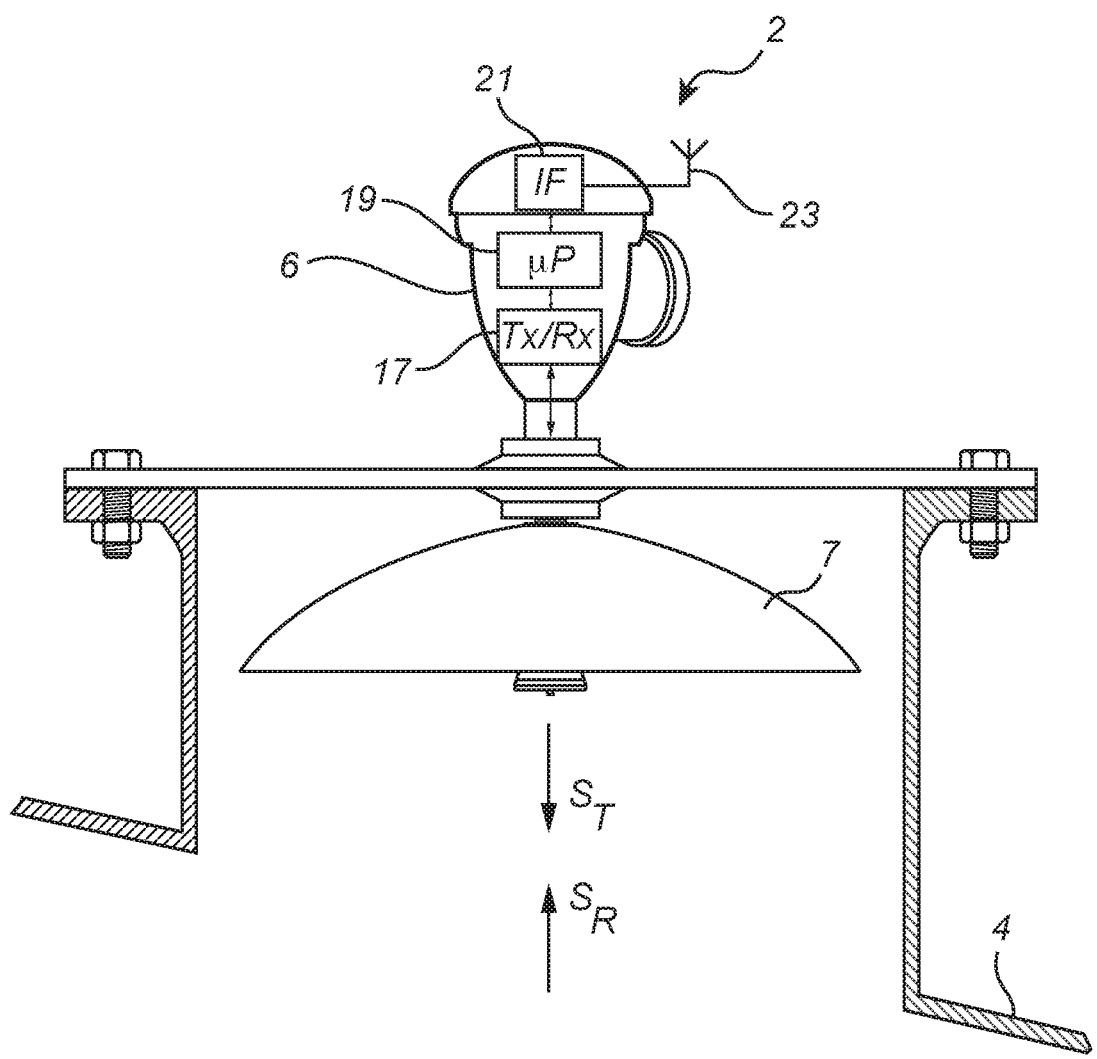
FIG. 2 is an enlarged view of the radar level gauge system in FIG. 1.

As is schematically indicated in FIG. 2, the measuring unit 6 of the radar level gauge system 2 comprises a transceiver 17, processing circuitry 19, a communication interface 21, and a communication antenna 23.

The transceiver 17 is configured to generate, transmit and receive electromagnetic signals, the processing circuitry 19 is connected to the transceiver 17 and configured to determine the filling level $L_S$ of the product 3 based on a received electromagnetic reflection signal $S_R$ being a reflection of the electromagnetic transmit signal $S_T$ at the surface 11 of the product 3, and the communication interface 21 is coupled to the processing circuitry 19 and configured to allow communicating with the host system 10. In the example embodiment of FIG. 2, the communication between the radar level gauge 2 and the host system 10 is indicated as being wireless communication. Alternatively, communication may, for example, take place over an analog and/or digital wire-based communication channel. For instance, the communication channel may be a two-wire 4-20 mA loop and the filling level may be communicated by providing a certain current corresponding to the filling level on the two-wire 4-20 mA loop. Digital data may also be sent across such a 4-20 mA loop, using the HART protocol. Furthermore, pure digital communication protocols such as Modbus or Foundation Fieldbus may be used.

Figure 3A:
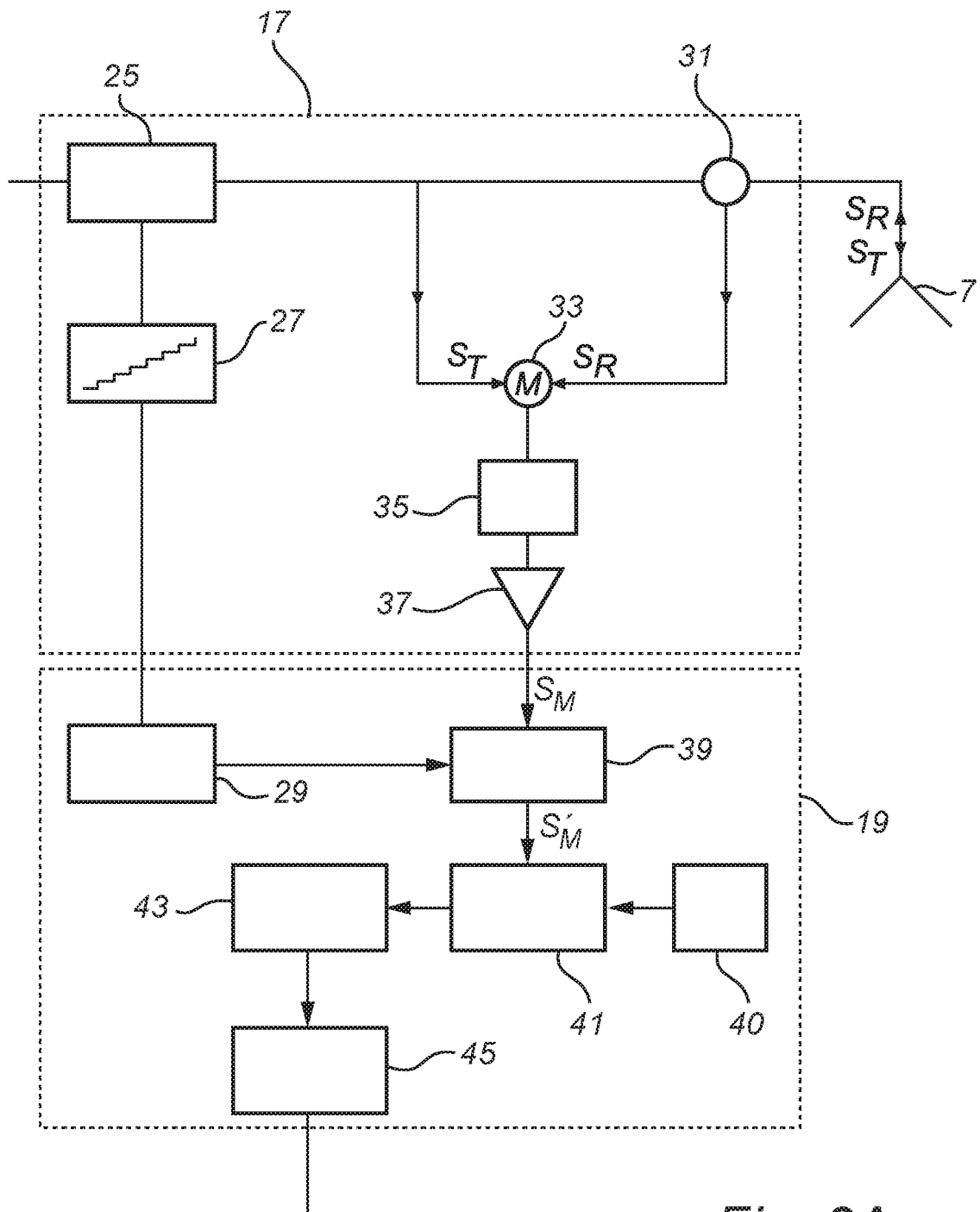
FIG. 3A is a partial schematic block diagram of a radar level gauge system according to a first example embodiment of the present invention.

FIG. 3A is a partial schematic block diagram of a radar level gauge system according to a first example embodiment of the present invention. Referring to FIG. 3A, the block diagram shows a measurement channel comprising the transceiver 17 and the measurement processor 19 in FIG. 2.

The transceiver 17 is here shown as including a microwave source 25 driven by a step generator 27, in turn controlled by timing circuitry 29 included in the measurement processor 19. The microwave source 25 is connected to the antenna 7 via a power divider 31. The power divider 31 is arranged to connect a reflection signal from the antenna 7 to a mixer 33, which is also connected to receive the signal from the microwave source 25. The mixer output is connected to a low pass filter 35 and an amplifier 37.

The measurement processor 19 here includes, in addition to the timing circuitry 29 mentioned above, a sampler 39 configured to receive and sample the measurement signal $S_M$ (a measurement signal of this kind is often referred to as an intermediate frequency signal) output by the mixer 33, low pass filtered by the low pass filter 35 and amplified by the amplifier 37. The measurement signal $S_M$ is formed based on the transmit signal $S_T$ and the reflection signal $S_R$, and includes surface echo information (frequency difference between the transmit signal and the reflection signal) indicative of the filling level $L_S$ of the product 3 in the tank 4.

The sampler 39 may, for example, comprise a sample-and-hold circuit in combination with an A/D-converter, or be realized as a sigma-delta converter. The sampler 39 may be controlled by the timing circuitry 29 to be synchronized with the transmit signal $S_T$. In the embodiment shown in FIG. 3A, the measurement processor 19 further includes proof test echo information adding circuitry 40, signal processor 41, a memory 43, and a level determinator 45.

While the elements of the transceiver 17 are typically implemented in hardware, and form part of an integrated unit normally referred to as a microwave unit, at least some portions of the measurement processor 19 may typically be embodied by software modules executed by an embedded processor. The invention is not restricted to this particular realization, and any implementation found suitable to realize the herein described functionality may be contemplated.

With reference to FIG. 3A, the timing circuitry 29 controls the microwave source 25 via the step generator 27 to form the transmit signal $S_T$. The transmit signal $S_T$ may be provided in the form of a time sequence of a number of discrete and mutually different frequencies.

The reflection signal $S_R$ results from reflection of the transmit signal $S_T$ at impedance discontinuities (including the surface 11 indicated in FIG. 1). Due to the time-of-flight from the radar level gauge system to different impedance discontinuities and back, the reflection signal $S_R$ will be a delayed copy of the transmit signal $S_T$, where the portions of the reflection signal $S_R$ reflected from the different impedance discontinuities will exhibit different phase differences as compared to the transmit signal $S_T$. The phase differences will, furthermore, change in steps with the changes in transmitted discrete frequency.

The above-mentioned measurement signal $S_M$ (or intermediate frequency signal) is formed by combining the transmit signal $S_T$ and the reflection signal $S_R$ in the mixer 33.

If a transmit signal with a continuously varying frequency had been used, the measurement signal $S_M$ would have been a continuous signal comprising one frequency component for each time-of-flight corresponding to the different impedance discontinuities encountered by the transmit signal.

Since the transmit signal $S_T$ is, in this particular example, instead a sequence of discrete frequencies, the phase difference will vary in steps, which means that the measurement signal $S_M$ will be piece-wise constant with the same duration of the constant portions as the duration of transmission of the different frequencies of the transmit signal $S_T$.

The measurement signal $S_M$ is sampled by the sampler 39, and provided to the signal processor 41. The proof test echo information adding circuitry 40 provides proof test echo information indicative of a predefined proof test level $L_{PT}$ to the signal processor, where the proof test echo information is added to the measurement representation (the sampled values of the measurement signal $S_M$) to form a modified measurement representation. In this example embodiment, where the radar level gauge system 2 is of the FMCW-type, the added proof test echo information may simply be digital values representing a sine wave with a single frequency corresponding to the proof test level $L_{PT}$.

The thus modified measurement representation is then processed by the signal processor 41 in order to determine a data set indicative of echoes from impedance discontinuities, as well as the added "synthetic" echo at the proof test level $L_{PT}$. The modified measurement representation is transformed from the time domain to the frequency domain using, for example, FFT (Fast Fourier Transform). Following transformation to the frequency domain of the modified measurement representation, the resulting frequency spectrum is transformed to an echo curve, which may be used by the level determinator 45 to determine the proof test level $L_{PT}$, as well as the filling level $L_S$ of the product 3 in the tank 4.

Figure 3B:
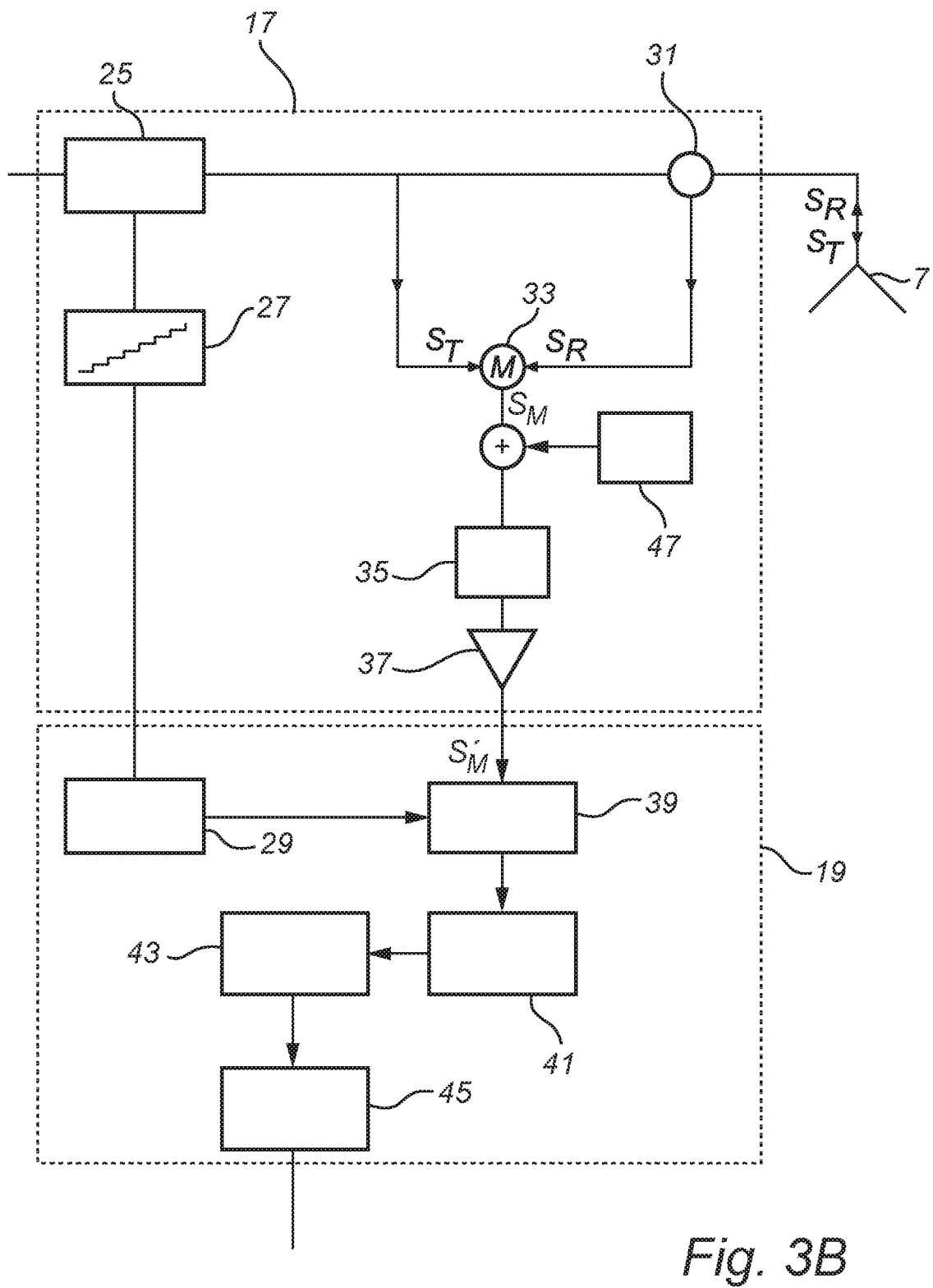
FIG. 3B is a partial schematic block diagram of a radar level gauge system according to a second example embodiment of the present invention.

FIG. 3B is a partial schematic block diagram of a radar level gauge system according to a second example embodiment of the present invention.

The second example embodiment shown in FIG. 3B mainly differs from the first example embodiment described above in connection with FIG. 3A in that the proof test information is added earlier in the measurement chain. In particular, as is schematically shown in FIG. 3B, the transceiver 17 comprises proof test echo information adding circuitry 47 in the form of a controllable oscillator that is controllable to add a proof test echo information signal to the measurement representation (measurement signal $S_M$ output by the mixer 33). The proof test echo information signal may be a single frequency sine wave, with a frequency selected to indicate the predefined proof test level $L_{PT}$. It may be desirable to provide signals with a limited bandwidth, including frequencies around the above-mentioned selected frequency, to make the synthetic echo resulting from the introduction of the proof test echo information signal look realistic. The proof test echo information signal may be added to the measurement signal $S_M$ in any suitable way, for example using a microwave hybrid circuit, such as a so-called balun, or any other suitable microwave hybrid circuit known to those skilled in the art.

The subsequent processing of the modified measurement representation $S_M'$ may be carried out as described above with reference to FIG. 3A.

Figure 4:
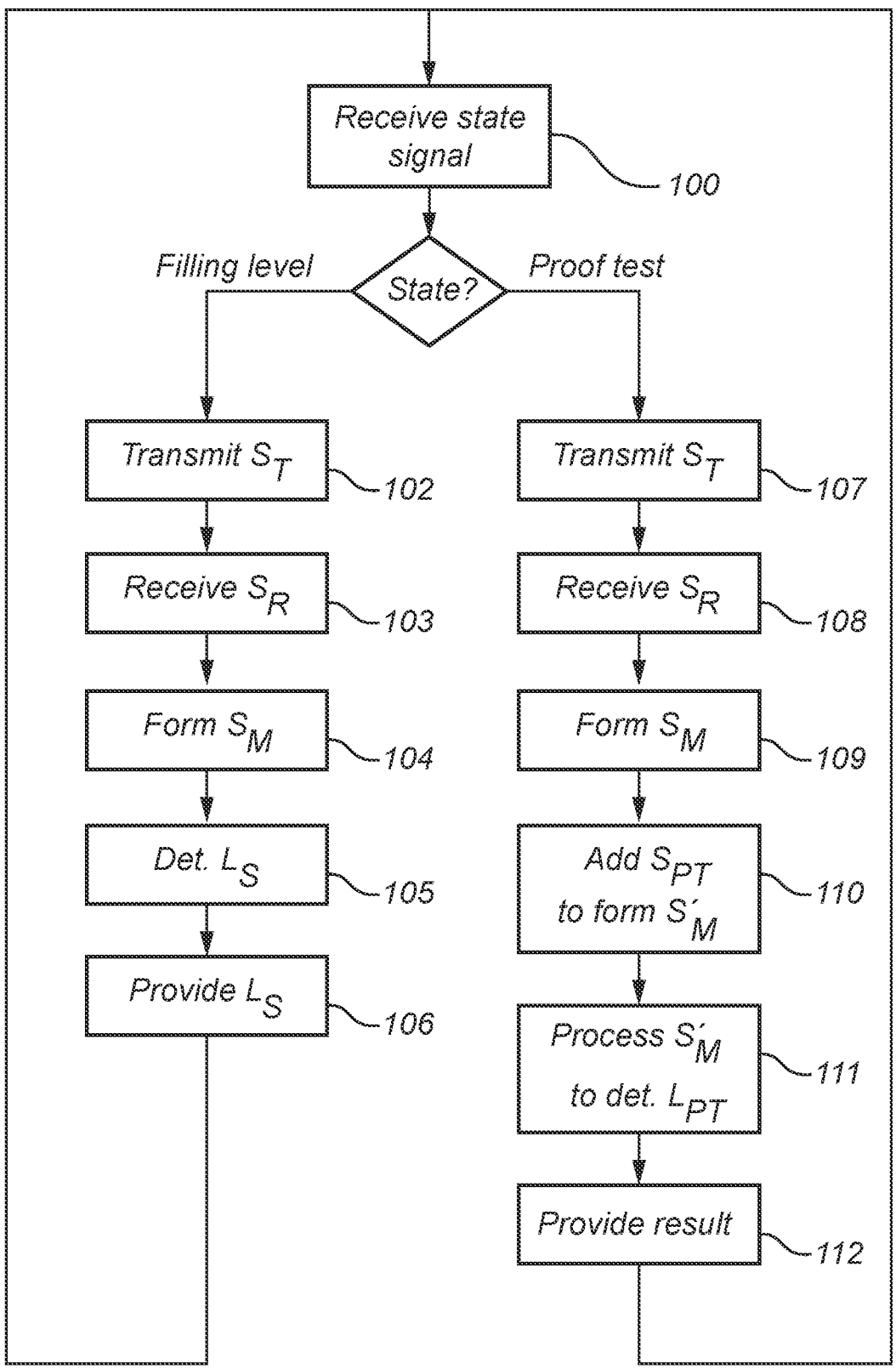
FIG. 4 is a flow-chart schematically illustrating an example embodiment of the method according to the present invention.

An example embodiment of the method according to the present invention will now be described with reference to the flow-chart in FIG. 4.

In a first step 100, the radar level gauge system 2 receives a state signal indicating a desired state of the radar level gauge system 2. The state signal may for example be received from the host system/control room 10, or it may be provided to the radar level gauge system 2 by operating a physical switch, such as a push button or similar that may be provided on the measurement unit 6 of the radar level gauge system 2.

Figure 5:
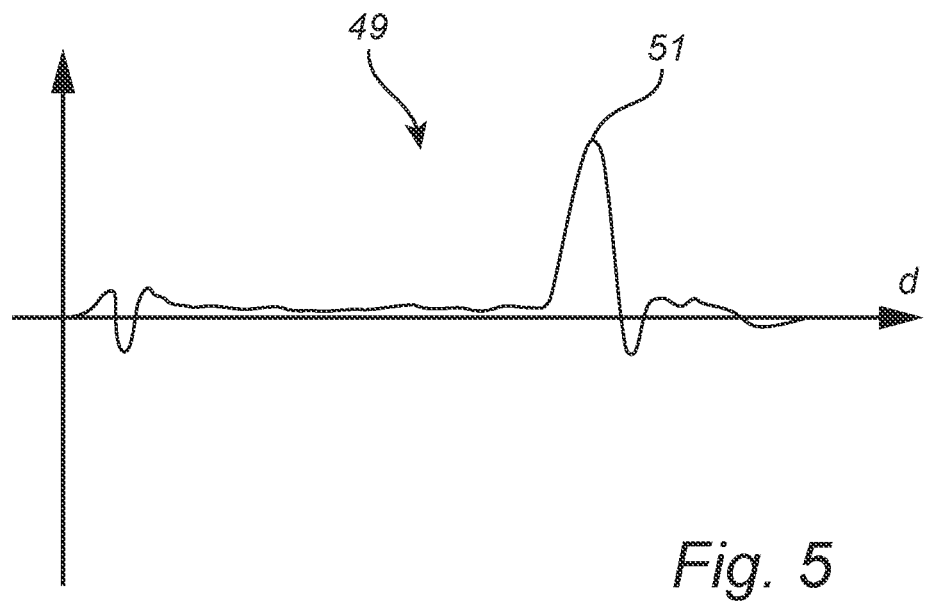
FIG. 5 is a diagram showing an example echo curve for the filling level measuring state of the radar level gauge system.

In the subsequent step 101, the state signal is evaluated, and if the state signal indicates that the radar level gauge system 2 should be in its filling level measuring state, the method proceeds to step 102, where the transceiver transmits the transmit signal $S_T$ as described further above. A reflection signal $S_R$ is received by the transceiver in step 103, and a measurement representation $S_M$ is formed in step 104. Based on the measurement representation $S_M$, the filling level $L_S$ is determined, by the processing circuitry 19 in step 105. As was described above with reference to FIG. 3A and FIG. 3B, the measurement representation may be processed to form an echo curve, such as the example echo curve 49 in the diagram in FIG. 5. In the diagram in FIG. 5, a representation of the signal strength of the reflected signal is shown as a function of the distance from the antenna 7. The surface echo 51 resulting from reflection of the transmit signal $S_T$ at the surface 11 of the product 3 in the tank 4 is the highest positive peak in FIG. 5. Based on an identification of the surface echo 51 and prior knowledge of the position of the antenna 7 in relation to the bottom of the tank 4, the filling level $L_S$ can be determined. The determined filling level $L_S$ is provided via the interface 21 and the antenna 23, for example to the host system 10 in step 106. Thereafter, the method returns to step 100.

If it is instead determined in step 101 that the state signal indicates that the radar level gauge system 2 should be in its proof test state, the method proceeds to step 107, where the transceiver transmits the transmit signal $S_T$ as described further above. A reflection signal $S_R$ is received by the transceiver in step 108, and a measurement representation $S_M$ is formed in step 109. In the subsequent step 110, proof test echo information $S_{PT}$ indicative of a predefined proof test level $L_{PT}$ is added to the measurement representation $S_M$, to form a modified measurement representation $S_M'$. Two exemplary ways of adding such proof test echo information $S_{PT}$ to the measurement representation $S_M$ to form a modified measurement representation $S_M'$ have been described above with reference to FIG. 3A and FIG. 3B.

To make the synthetic echo resulting from the proof test echo information $S_{PT}$ more realistic, the proof test echo information may vary slightly between measurement cycles to give the impression of a slowly moving surface level around the predefined proof test level $L_{PT}$. This optional procedure may facilitate subsequent identification of the proof test echo as the surface echo.

Furthermore, the proof test information $S_{PT}$ that is added to the measurement representation $S_M$ in step 110 may be adapted to the measurement conditions in the tank 4 to provide a more realistic proof test. For instance, the proof test information $S_{PT}$ may be determined based on previously acquired information about the product 3 in the tank 4, such as the dielectric constant of the product 3. In addition, or as an alternative, the proof test information $S_{PT}$ may be determined based on the measurement representation $S_M$. For instance, the amplitude and/or other properties of the surface echo may be used for determining a suitable amplitude and/or other properties of the synthetic proof test echo.

The modified measurement representation $S_M'$ is then processed, in step 111, to determine the proof test level $L_{PT}$. As was described above with reference to FIG. 3A and FIG. 3B, the modified measurement representation $S_M'$ may be processed to form an echo curve, such as the example echo curve 53 in the diagram in FIG. 6. In the diagram in FIG. 6, a representation of the signal strength of the reflected signal is shown as a function of the distance from the antenna 7, including an example synthetic proof test echo provided by the proof test echo information adding circuitry. In this illustrative example, the surface echo 55 resulting from reflection of the transmit signal $S_T$ at the surface 11 of the product 3 in the tank 4 is the highest positive peak in FIG. 5, and the synthetic proof test echo 57 is the first clear positive peak counting from the top of the tank 4.

It should be noted that the proof test information $S_{PT}$ may be determined to achieve a different modified measurement representation $S_M'$. For instance, the proof test information $S_{PT}$ may be determined to increase the probability that the level determinator 45 determines that the synthetic proof test echo indicates the filling level of the product 3, and provides a filling level signal indicative of the proof test level $L_{PT}$. To that end, the proof test information $S_{PT}$ may be determined to result in a synthetic proof test echo with an amplitude higher than a predetermined threshold, or to result in an echo with the highest amplitude in the echo curve 53. Furthermore, the proof test information $S_{PT}$ may be determined to achieve a slow movement over time of the synthetic proof test echo 57, as was described further above. How to determine the proof test information to increase the probability that the level determinator 45 determines that the synthetic proof test echo 57 indicates the filling level will typically depend on the algorithm for selecting which surface echo candidate represents the real surface echo in the filling level measuring state. Based on the description herein, the skilled person will be able to appropriately determine the proof test information $S_{PT}$.

As an alternative or complement to adapting the synthetic proof test echo 57 as described above, the radar level gauge system 2 may, in the proof test state, be temporarily configured to search for the surface echo in a predefined range around the predefined proof test level $L_{PT}$.

According to a further alternative, the criteria for selecting which surface echo candidate represents the real surface echo may be changed temporarily. When the radar level gauge system 2 is controlled to be in the proof test state, the surface echo identification criteria may, for example, be that the first positive peak higher than a predefined threshold as assigned to be the surface echo, regardless of any echo tracking or similar.

The result may, for example, be provided to the host system/control room 10 in step 112, and may be provided in the form of a signal indicative of the determined level, or as an alarm signal in embodiments where the radar level gauge system 2 itself identifies a measured level as being at or above the high level alarm limit. Thereafter, the method returns to step 100. If the synthetic proof test echo 57 at the predefined proof test level $L_{PT}$ can be properly detected and measured by the radar level gauge system 2, the proof test is successful, and may be terminated. If the synthetic proof test echo 57 cannot be detected and/or is not properly measured by the radar level gauge system 2, the proof test may have failed, and further action may need to be taken. Such further action may, for example, be to redo the proof test, and then possibly to perform a full proof test involving bringing the surface up to the high level alarm limit.

Figure 6:
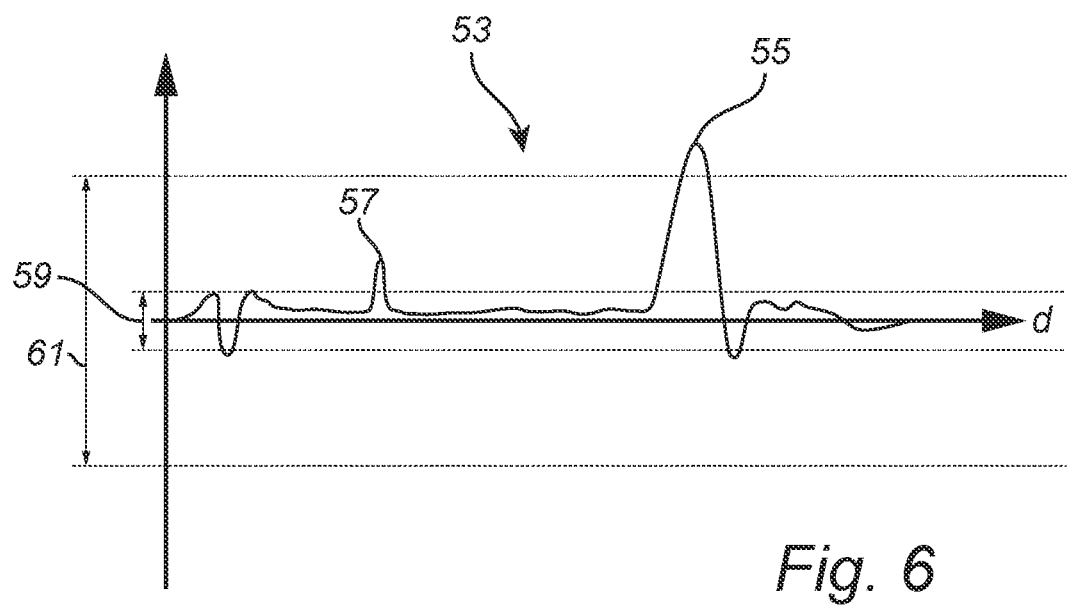
FIG. 6 is a diagram showing an example echo curve for the proof test state of the radar level gauge system.

For illustrative purposes, FIG. 6 indicates a first exemplary noise level 59, and a second exemplary noise level 61. For the first noise level 59, the proof test echo 57 can be detected, and the proof test be determined to be successful. For the second noise level 61, however, it may not be possible for the radar level gauge system 2 to detect the proof test echo 57, which means that the proof test will fail.

To make the proof test as realistic as possible, the surface echo 55 may be evaluated, and the proof test information that is added to the measurement representation may be adapted to at least one property of the surface echo signal. For instance, the detected amplitude of the surface echo 55 may be used for determining the desired amplitude of the proof test echo 57. Once the desired amplitude of the proof test echo 57 has been determined, the proof test information can be adapted to achieve this amplitude. Alternatively or in combination, the proof test information can be adapted based on other properties of the product in the tank, such as the dielectric constant of the product and/or the (expected) occurrence of turbulence etc.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A method of proof-testing a radar level gauge system arranged to determine a filling level of a product in a tank, the method comprising the steps of:
   transmitting an electromagnetic transmit signal towards a surface of the product in the tank;
   receiving an electromagnetic reflection signal resulting from reflection of the transmit signal at the surface of the product;
   forming a measurement representation based on the transmit signal and the reflection signal, the measurement representation comprising surface echo information indicative of the filling level of the product;
   adding, to the measurement representation, proof test echo information indicative of a predefined proof test level corresponding to, or being higher than, a high level alarm limit of the radar level gauge system, resulting in a modified measurement representation;
   processing the modified measurement representation to determine a proof test level based on the modified measurement representation; and
   providing a signal indicative of a result of the processing.

2. The method according to claim 1, wherein the method further comprises the steps of:
   receiving the signal indicative of the result of the processing; and
   providing a proof test alarm when the signal indicates the proof test level.

3. A method of operating a radar level gauge system arranged to determine a filling level of a product in a tank, the radar level gauge system being controllable between a filling level measuring state and a proof test state, wherein the method comprises the steps of:
   receiving a state signal indicating a desired state of the radar level gauge system;
   when the state signal indicates the filling level measuring state:
   transmitting an electromagnetic transmit signal towards a surface of the product in the tank;
   receiving an electromagnetic reflection signal resulting from reflection of the transmit signal at the surface of the product;
   forming a measurement representation based on the transmit signal and the reflection signal, the measurement representation comprising surface echo information indicative of the filling level of the product; and
   determining the filling level based on the measurement representation; and
   when the state signal indicates the proof test state:
   transmitting an electromagnetic transmit signal towards a surface of the product in the tank;
   receiving an electromagnetic reflection signal resulting from reflection of the transmit signal at the surface of the product;
   forming a measurement representation based on the transmit signal and the reflection signal, the measurement representation comprising surface echo information indicative of the filling level of the product;
   adding, to the measurement representation, proof test echo information indicative of a predefined proof test level, resulting in a modified measurement representation;
   processing the modified measurement representation to determine a proof test level based on the modified measurement representation; and
   providing a signal indicative of a result of the processing.

4. The method according to claim 1, wherein:
   the step of forming the measurement representation comprises the steps of:
   combining the reflection signal and a reference signal being timing related to the transmit signal to form an analog measurement signal; and
   analog-to-digital converting the analog measurement signal to form the measurement representation as a digital measurement representation; and
   the step of adding comprises the step of:
   adding, to the digital measurement representation, digital values indicating the proof test level to form the modified measurement representation.

5. The method according to claim 1, wherein:
   the step of forming the measurement representation comprises the step of:

combining the reflection signal and a reference signal being timing related to the transmit signal to form the measurement representation as an analog measurement signal; and the step of adding comprises the step of:

adding a proof test level signal to the analog measurement signal to form the modified measurement representation as a modified analog measurement signal.

6. The method according to claim 1, wherein the step of adding comprises:

adding, to the measurement representation, proof test echo information indicative of a time-sequence of different levels, including the predefined proof test level.

7. The method according to claim 1, further comprising the step of:

determining the proof test echo information based on previously acquired information about measurement conditions in the tank.

8. The method according to claim 7, wherein the proof test echo information is determined based on known properties of the product in the tank.

9. The method according to claim 7, wherein the proof test echo information is determined based on previously acquired surface echo information.

10. The method according to claim 1, wherein:

said transmit signal is a frequency modulated signal exhibiting a time-varying frequency; and the step of forming the measurement representation comprises mixing the transmit signal and the reflection signal.

11. The method according to claim 10, wherein the proof test information includes a predefined frequency being indicative of the predefined proof test level.

12. A radar level gauge system for determining a filling level of a product in a tank, the radar level gauge system comprising:

a transceiver for generating, transmitting and receiving electromagnetic signals;

a signal propagation arrangement connected to the transceiver and arranged to propagate an electromagnetic transmit signal from the transceiver towards the product in the tank, and to return to the transceiver an electromagnetic reflection signal resulting from reflection of the electromagnetic transmit signal at a surface of the product; and measurement representation forming circuitry for forming a measurement representation based on the transmit signal and the reflection signal, the measurement representation comprising surface echo information indicative of the filling level of the product;

proof test echo information adding circuitry, for adding to the measurement representation, proof test echo information indicative of a predefined proof test level corresponding to, or being higher than, a high level alarm limit of the radar level gauge system, resulting in a modified measurement representation; and level determining circuitry coupled to the transceiver and configured to determine a proof test level based on the modified measurement representation.

13. The radar level gauge system according to claim 12, wherein the level determining circuitry is further configured to provide a proof test signal indicative of the proof test level.

14. The radar level gauge system according to claim 12, wherein the level determining circuitry is further configured to determine the filling level in the tank based on the measurement representation.

15. The radar level gauge system according to claim 12, wherein the radar level gauge is controllable between a filling level measuring state and a proof test state, and wherein, in the proof test state, the level determining circuitry is configured to:

determine the proof test level based on the modified measurement representation; and provide a signal indicative of the proof test level to allow determination of a proof test result based on the proof test level.

16. The radar level gauge system according to claim 15, wherein, in the filling level measuring state, the level determining circuitry is configured to:

determine the filling level of the product in the tank based on the measurement representation; and provide a signal indicative of the filling level.

17. The radar level gauge system according to claim 12, wherein:

the measurement representation forming circuitry is configured to:

combine the reflection signal and a reference signal being timing related to the transmit signal to form an analog measurement signal; and analog-to-digital convert the analog measurement signal to form the measurement representation as a digital measurement representation; and the proof test echo information adding circuitry is configured to:

add, to the digital measurement representation, digital values indicating the proof test level to form the modified measurement representation.

18. The radar level gauge system according to claim 12, wherein:

the measurement representation forming circuitry is configured to:

combine the reflection signal and a reference signal being timing related to the transmit signal to form the measurement representation as an analog measurement signal; and the proof test echo information adding circuitry is configured to:

add a proof test level signal to the analog measurement signal to form the modified measurement representation as a modified analog measurement signal.

19. The radar level gauge system according to claim 12, wherein:

the transceiver is configured to transmit the transmit signal in the form of a frequency modulated signal exhibiting a time-varying frequency; and the measurement representation forming circuitry comprises a mixer arranged and configured to mix the transmit signal and the reflection signal.

* * * * *